(12) United States Patent
Macfarlane

(10) Patent No.: US 10,371,545 B2
(45) Date of Patent: Aug. 6, 2019

(54) METHOD AND APPARATUS FOR PROVIDING QUALITATIVE TRAJECTORY ANALYTICS TO CLASSIFY PROBE DATA

(71) Applicant: HERE Global B.V., Veldhoven (NL)

(72) Inventor: Jane Macfarlane, Oakland, CA (US)

(73) Assignee: HERE Global B.V., Veldhoven (NL)

( * ) Notice: Subject to any disclaimer, the term of this patent is extended or adjusted under 35 U.S.C. 154(b) by 422 days.

(21) Appl. No.: 14/638,401

(22) Filed: Mar. 4, 2015

(65) Prior Publication Data

US 2016/0258754 A1 Sep. 8, 2016

(51) Int. Cl.
*G01C 21/36* (2006.01)
*G01C 21/32* (2006.01)

(52) U.S. Cl.
CPC ......... *G01C 21/3679* (2013.01); *G01C 21/32* (2013.01)

(58) Field of Classification Search
CPC .................................................. G01C 21/3679
USPC .......................................................... 702/150
See application file for complete search history.

(56) References Cited

U.S. PATENT DOCUMENTS

| | | | |
|---|---|---|---|
| 8,032,276 B2 | 10/2011 | Cawse et al. | |
| 8,538,676 B2 | 9/2013 | Wuersch et al. | |
| 2012/0116678 A1* | 5/2012 | Witmer | G01C 21/32 702/5 |
| 2012/0277985 A1 | 11/2012 | Witmer et al. | |
| 2013/0166196 A1 | 6/2013 | Narasimha et al. | |

(Continued)

FOREIGN PATENT DOCUMENTS

| | | |
|---|---|---|
| EP | 1528525 B1 | 5/2005 |
| JP | 2230499 A2 | 9/1990 |
| WO | 2011082611 A1 | 7/2011 |

OTHER PUBLICATIONS

Yiliang Zeng, et al. "A Novel Multisensor Traffic State Assessment System Based on Incomplete Data", The Scientific World Journal, Aug. 4, 2014.

(Continued)

*Primary Examiner* — Moazzam Hossain
*Assistant Examiner* — Omar F Mojaddedi
(74) *Attorney, Agent, or Firm* — Ditthavong & Steiner, P.C.

(57) ABSTRACT

An approach is provided for classifying probe data into qualitative categories to determine a point of interest. The approach involves processing and/or facilitating a processing of probe data to determine one or more trajectories associated with one or more probes. The approach also involves determining one or more clips of the one or more trajectories associated with one or more locations at which the one or more probes lingered based, at least in part, on at least one space threshold value, at least one time threshold value, or a combination thereof. The approach further involves causing, at least in part, an extraction of one or more probe parameter values from the one or more clips. The approach also involves causing, at least in part, a classification of the one or more probe parameter values into one or more qualitative categories. The approach further involves determining one or more points of interest, one or more characteristics of the one or more points of interest, or a combination thereof associated with the one or more locations based, at least in part, on the one or more qualitative categories.

20 Claims, 12 Drawing Sheets

(56) References Cited

U.S. PATENT DOCUMENTS

| | | | | |
|---|---|---|---|---|
| 2013/0326425 | A1* | 12/2013 | Forstall | G01C 21/3638 |
| | | | | 715/851 |
| 2013/0337830 | A1* | 12/2013 | Haro | H04W 4/02 |
| | | | | 455/456.1 |
| 2014/0148972 | A1 | 5/2014 | Basir et al. | |
| 2014/0372022 | A1* | 12/2014 | Witmer | G01C 21/32 |
| | | | | 701/423 |

OTHER PUBLICATIONS

Kostas Patroumpas, et al., "Event Processing and Real-time Monitoring over Streaming Traffic Data", Web and Wireless Geographical Information Systems, Lecture Notes in Computer Science vol. 7236, Apr. 2012, pp. 116-133.

* cited by examiner

METHOD AND APPARATUS FOR PROVIDING QUALITATIVE TRAJECTORY ANALYTICS TO CLASSIFY PROBE DATA

BACKGROUND

Location based services can be improved if it has knowledge on user movements throughout a geographical area. As a result, the location based services are assembling and analyzing probe data to provide information on user movements in real-time. Since, voluminous quantity of probe data are collected from devices associated with the users and/or the vehicles, extracting relevant information is an arduous task. Accordingly, service providers and device manufacturers face significant technical challenges in providing a service that categorizes probe data to derive relevant information to better assist users in identifying characteristics associated with at least one point of interest.

SOME EXAMPLE EMBODIMENTS

Therefore, there is a need for an approach for classifying probe data into qualitative categories to determine a point of interest.

According to one embodiment, a method comprises processing and/or facilitating a processing of probe data to determine one or more trajectories associated with one or more probes. The method also comprises determining one or more clips of the one or more trajectories associated with one or more locations at which the one or more probes lingered based, at least in part, on at least one space threshold value, at least one time threshold value, or a combination thereof. The method further comprises causing, at least in part, an extraction of one or more probe parameter values from the one or more clips. The method also comprises causing, at least in part, a classification of the one or more probe parameter values into one or more qualitative categories. The method further comprises determining one or more points of interest, one or more characteristics of the one or more points of interest, or a combination thereof associated with the one or more locations based, at least in part, on the one or more qualitative categories.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of probe data to determine one or more trajectories associated with one or more probes. The apparatus is also caused to determine one or more clips of the one or more trajectories associated with one or more locations at which the one or more probes lingered based, at least in part, on at least one space threshold value, at least one time threshold value, or a combination thereof. The apparatus is further caused to cause, at least in part, an extraction of one or more probe parameter values from the one or more clips. The apparatus is also caused to cause, at least in part, a classification of the one or more probe parameter values into one or more qualitative categories. The apparatus is further caused to determine one or more points of interest, one or more characteristics of the one or more points of interest, or a combination thereof associated with the one or more locations based, at least in part, on the one or more qualitative categories.

According to another embodiment, a computer-readable storage medium carries one or more sequences of one or more instructions which, when executed by one or more processors, cause, at least in part, an apparatus to process and/or facilitate a processing of probe data to determine one or more trajectories associated with one or more probes. The apparatus is also caused to determine one or more clips of the one or more trajectories associated with one or more locations at which the one or more probes lingered based, at least in part, on at least one space threshold value, at least one time threshold value, or a combination thereof. The apparatus is further caused to cause, at least in part, an extraction of one or more probe parameter values from the one or more clips. The apparatus is also caused to cause, at least in part, a classification of the one or more probe parameter values into one or more qualitative categories. The apparatus is further caused to determine one or more points of interest, one or more characteristics of the one or more points of interest, or a combination thereof associated with the one or more locations based, at least in part, on the one or more qualitative categories.

According to another embodiment, an apparatus comprises means for processing and/or facilitating a processing of probe data to determine one or more trajectories associated with one or more probes. The apparatus also comprises means for determining one or more clips of the one or more trajectories associated with one or more locations at which the one or more probes lingered based, at least in part, on at least one space threshold value, at least one time threshold value, or a combination thereof. The apparatus further comprises means for causing, at least in part, an extraction of one or more probe parameter values from the one or more clips. The apparatus also comprises means for causing, at least in part, a classification of the one or more probe parameter values into one or more qualitative categories. The apparatus further comprises means for determining one or more points of interest, one or more characteristics of the one or more points of interest, or a combination thereof associated with the one or more locations based, at least in part, on the one or more qualitative categories.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for classifying probe data into qualitative categories to determine a point of interest are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
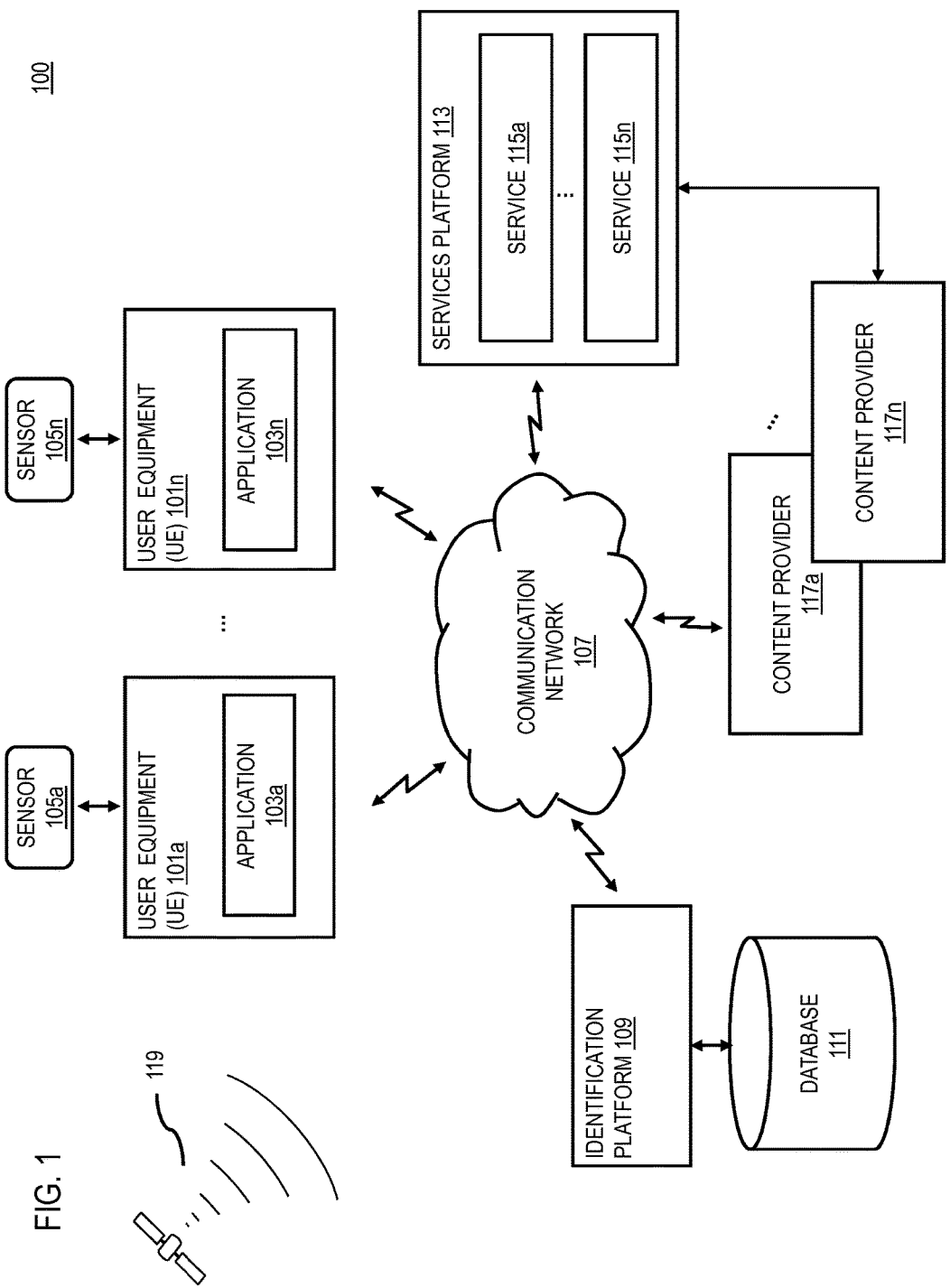
FIG. 1 is a diagram of a system capable of classifying probe data into qualitative categories to determine a point of interest, according to one embodiment.

FIG. 1 is a diagram of a system capable of classifying probe data into qualitative categories to determine a point of interest, according to one embodiment. In one scenario, probe data is an identification of a device (e.g., latitude, longitude, speed, heading, etc.). The probe data may be delivered at a variety of different sampling rates depending on the device (e.g., device associated with the user and/or the vehicle) that is delivering the data. Consequently, significant quantity of probe data are assembled, and most of the probe data are redundant.

To address this problem, a system 100 of FIG. 1 introduces the capability to classify trajectories (i.e., a collection of probe data for one probe over time) in terms of an inferred activity. In one scenario, the system 100 may gather probe data over time, and may analyze the probe data to provide information on user activities. In one scenario, controller area network (CAN bus) may allow any embedded system (e.g., electronic control units (ECU)) that controls one or more electrical system or subsystems in a vehicle to communicate with each other in applications without a host computer. The CAN bus data (e.g., sensor information) from one or more vehicles may be gathered and processed. In one example embodiment, the system 100 may identify whether a trajectory indicates a congestion behavior, for instance, a congestion behavior may exhibit acceleration and deceleration profile in a limited spatial area. In one scenario, congestion information may be used in a variety of applications, for example, navigation, routing and city planning. In another scenario, the system 100 may collect the profile information of vehicles visiting at least one point of interest. In one example embodiment, the profile information for the vehicles may exhibit a deceleration, a temporary stop, and acceleration. This pattern may be used to identify a class of business (e.g., a gas station, a fast food restaurant with drive through lane, etc.). Then, the system 100 may process the profiles of the vehicles visiting the point of interest identified as a petrol station to determine its business hours.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to the identification platform 109 via the communication network 107. In one embodiment, the identification platform 109 performs one or more functions associated with classifying probe data into qualitative categories to determine a point of interest.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the UE 101 may be a vehicle (e.g., cars), a mobile device (e.g., phone), and/or a combination of the two.

By way of example, the applications 103 may be any type of application that is executable at the UE 101, such as mapping application, location-based service applications, navigation applications, content provisioning services, camera/imaging application, media player applications, social networking applications, calendar applications, and the like. In one embodiment, one of the applications 103 at the UE 101 may act as a client for the identification platform 109 and perform one or more functions associated with the functions of the identification platform 109 by interacting with the identification platform 109 over the communication network 107.

By way of example, the sensors 105 may be any type of sensor. In certain embodiments, the sensors 105 may include, for example, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, and the like. In another embodiment, the sensors 105 may include light sensors, orientation sensors augmented with height sensor and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors 105 may detect weather data, traffic information, or a combination thereof. In one example embodiment, the UE 101 may include GPS receivers to obtain geographic coordinates from satellites 119 for determining current location and time associated with the UE 101. Further, the location can be determined by a triangulation system such as A-GPS, Cell of Origin, or other location extrapolation technologies.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the identification platform 109 may be a platform with multiple interconnected components. The identification platform 109 may include multiple servers, intelligent networking devices, computing devices, components and corresponding software for classifying probe data into qualitative categories to determine a point of interest. In one scenario, the probe data includes a set of information pertaining to vehicle movements (e.g., vehicle speed information) with time-stamped geographic locations. In one example embodiment, a UE 101 (e.g., UE 101 associated with at least one vehicle, smart vehicles, etc.) may transmit probe data (e.g., speed information) via sensors 105 in real-time, as per schedule, as per request, or a combination. The identification platform 109 may collect probe data from devices associated with one or more users, one or more vehicles, or a combination thereof that are in motion. These probe data may be assembled into trajectories that provide a data description regarding spatial movements of one or more users. Since describing human activity is a challenging endeavor, the identification platform 109 may represent human activities in a qualitative framework with a standard computing language. This significantly reduces the computational time to make inferences about the user activities.

In one embodiment, the identification platform 109 may process probe data to determine one or more trajectories associated with one or more probes. Then, the identification platform 109 may determine one or more clips of the one or more trajectories associated with one or more locations at which the one or more probes lingered based, at least in part, on at least one space threshold value, at least one time threshold value, or a combination thereof. Subsequently, the identification platform 109 may extract probe parameter values from the one or more clips, and may classify the probe parameter values into qualitative categories to determine at least one point of interest.

In one scenario, the identification platform 109 may create a higher level of representations of user's activities to characterize at least one point of interest. In one example embodiment, specific activities of one or more users may be processed to determine whether a point of interest is a petrol station. The behavior patterns of users that visit the petrol station is very distinct (e.g., users tends to slow down and do some maneuverings, then the user stops for approximately five minutes and leaves). The identification platform 109 may determine such user behaviors around the petrol station and record them over time, and may characterize such behaviors as a mechanism for determining whether the petrol station is open or closed. Accordingly, the identification platform 109 may determine the existence of a petrol station and potentially the business hours of the petrol station. In another scenario, the identification platform 109 may create a higher level of representations of user's activities to characterize congestion level along a road clip. In one scenario, congestion may be described as a fairly controlled heading trajectory with a signature of user stopping, starting the vehicle, slowing down, and stopping again. In another scenario, the identification platform 109 may determine congestion when speed information for one or more vehicles falls below a predetermined speed threshold. Then, the identification platform 109 may characterize such behaviors as they build-up to determine the environment for the one or more users.

In one embodiment, the qualitative behavior derivation may be performed in at least one UE 101 associated with at least one vehicle, at least one user, or a combination thereof to reduce the bandwidth necessary to send the data to the cloud. In one example embodiment, the system 100 may enquire one or more users regarding congestion information via a short message service to allow for safe operation of crowd sourcing from a vehicle instead of at least one user volunteering to identify the congestion. In another embodiment, the identification of at least one point of interest or congestion build-up in at least one point of interest may be done on a smart cell tower to localize the computation and reduce the algorithm complexity in the cloud.

In one embodiment, the geographic database 111 may store probe identification, latitude data, longitude data, speed information, heading information, or a combination thereof for one or more vehicles, one or more users, or a combination thereof. The information may be any multiple types of information that can provide means for aiding in the content provisioning and sharing process.

The services platform 113 may include any type of service. By way of example, the services platform 113 may include mapping services, navigation services, travel planning services, notification services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the identification platform 109 and the content provider 117 to supplement or aid in the processing of the content information.

By way of example, the services 115 may be an online service that reflects interests and/or activities of users. The services 115 allow users to share location information, activities information (e.g., speed information), contextual information, historical user information and interests within their individual networks, and provides for data portability. The services 115 may additionally assist in providing the identification platform 109 with information on travel plans of at least one user, speed information for at least one user, user profile information, etc.

The content providers 117*a*-117*n* (collectively referred to as content provider 117) may provide content to the UE 101, the identification platform 109, and the services 115 of the services platform 113. The content provided may be any type of content, such as textual content, audio content, video content, image content, etc. In one embodiment, the content provider 117 may provide content that may supplement the content of the applications 103, the sensors 105, or a combination thereof. By way of example, the content provider 117 may provide content that may aid in the processing of probe data associated with at least one user, at least one vehicle, or a combination thereof. In one embodiment, the content provider 117 may also store content associated with the UE 101, the identification platform 109, and the services 115 of the services platform 113. In another embodiment, the content provider 117 may manage access to a central repository of data, and offer a consistent, standard interface to data, such as a repository of probe data for one or more users, one or more vehicles, or a combination thereof. Any known or still developing methods, techniques or processes for classifying probe data into qualitative categories to determine a point of interest may be employed by the identification platform 109.

By way of example, the UE 101, the identification platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
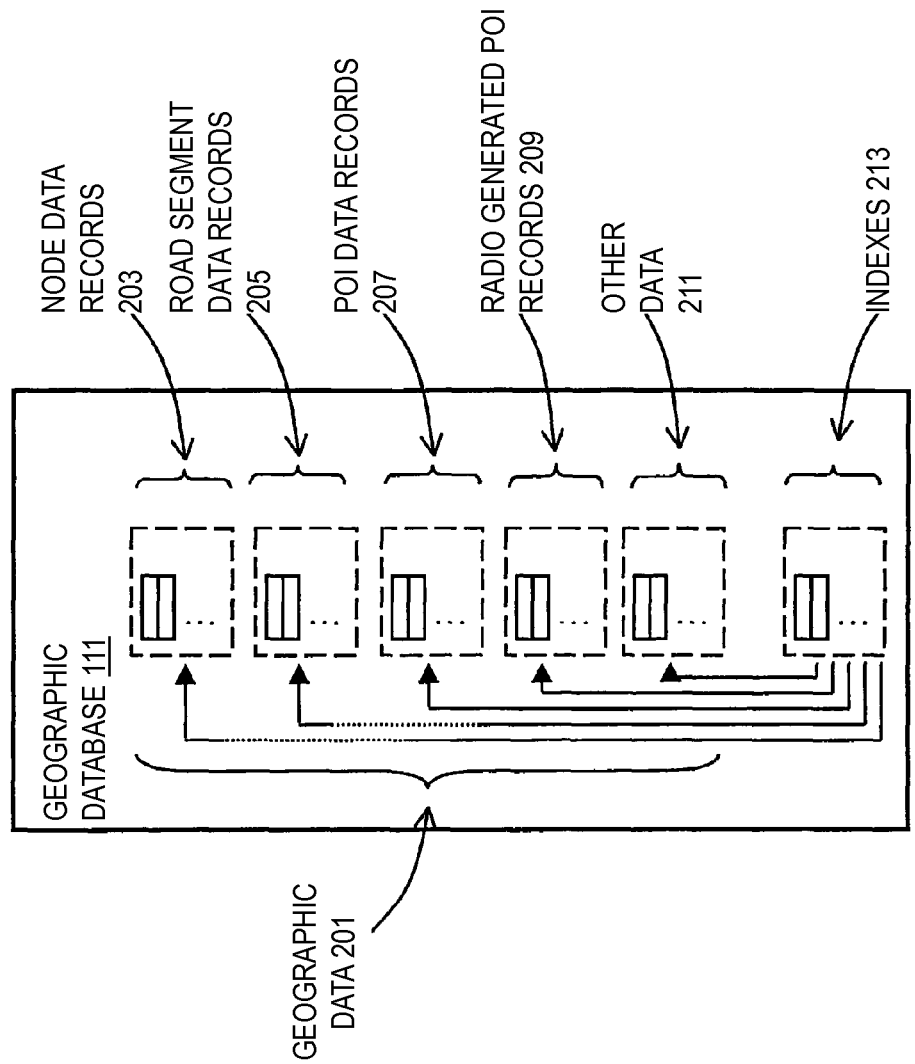
FIG. 2 is a diagram of the geographic database 111 of system 100, according to one embodiment.

FIG. 2 is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic database 111 includes geographic data 201 used for (or configured to be compiled to be used for) mapping and/or navigation-related services, such as for personalized route determination, according to exemplary embodiments. For example, the geographic database 111 includes node data records 203, road segment or link data records 205, POI data records 207, radio generated POI records 209, and other data records 211, for example. More, fewer or different data records can be provided. In one embodiment, the other data records 211 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 205 are links or segments representing roads, streets, or paths, as can be used in the calculated route or recorded route information for determination of one or more personalized routes, according to exemplary embodiments. The node data records 203 are end points corresponding to the respective links or segments of the road segment data records 205. The road link data records 205 and the node data records 203 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 207. The geographic database 111 can also include data about places, such as cities, towns, or other communities, and other geographic features, such as bodies of water, mountain ranges, etc. Such place or feature data can be part of the POI data records 207 or can be associated with POIs or POI data records 207 (such as a data point used for displaying or representing a position of a city). In addition, the geographic database 111 can include data from radio advertisements associated with the POI data records 207 and their respective locations in the radio generated POI records 209. By way of example, a street is determined from the user interaction with the UE 101 and the content information associated with UE 101, according to the various embodiments described herein.

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UE 101) to provided navigation-related functions. For example, the geographic database 111 can be used with the end user device UE 101 to provide an end user with navigation features. In such a case, the geographic database 111 can be downloaded or stored on the end user device UE 101, such as in applications 103, or the end user device UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions such as guidance and map display, for example, and for determination of route information to at least one identified point of interest, according to exemplary embodiments.

Figure 3:
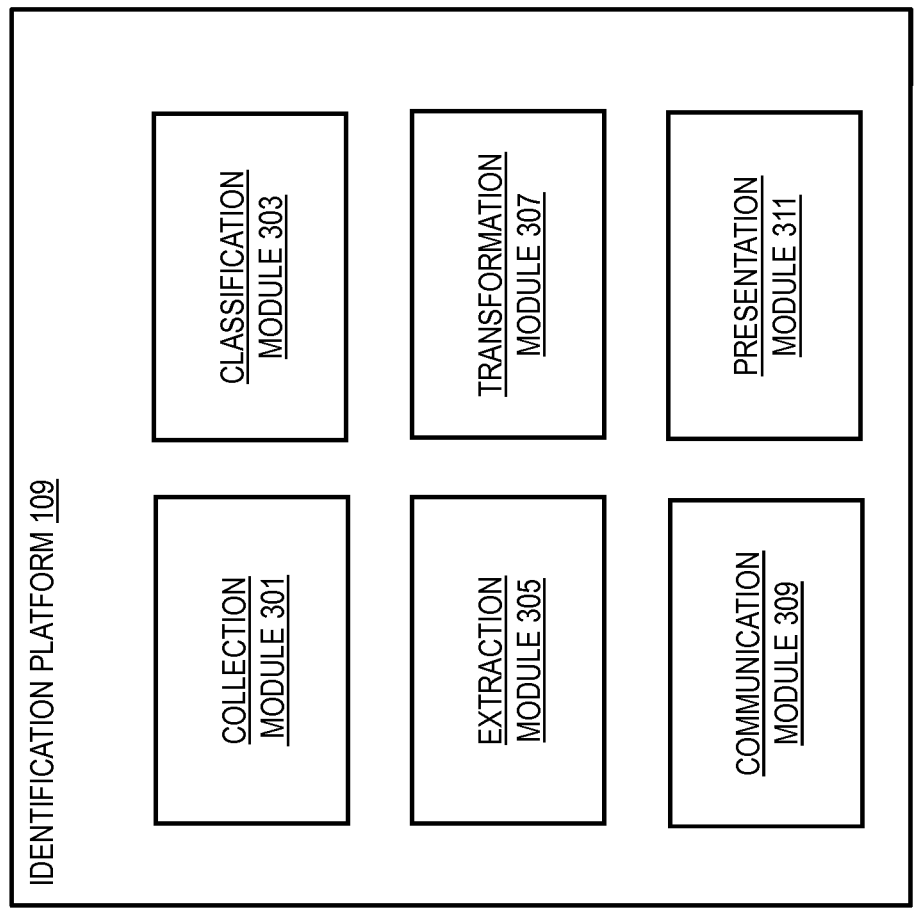
FIG. 3 is a diagram of the components of the identification platform 109, according to one embodiment.

FIG. 3 is a diagram of the components of the identification platform 109, according to one embodiment. By way of example, the identification platform 109 includes one or more components for classifying probe data into qualitative categories to determine a point of interest. It is contemplated that the functions of these components may be combined in one or more components or performed by other components of equivalent functionality. In this embodiment, the identification platform 109 includes a collection module 301, a classification module 303, an extraction module 305, a transformation module 307, a communication module 309 and a presentation module 311.

In one embodiment, the collection module 301 may assemble probe data from one or more devices associated with one or more vehicles, one or more users, or a combination thereof into one or more trajectories. In one scenario, the one or more probe data includes probe identification, latitude data, longitude data, speed information, heading information, or a combination thereof. Then, the identification platform 109 may determine one or more location points for the probe data in geographical space, time, or a combination thereof from a trajectory data to provide data descriptions for a user movement, a user activity, or a combination thereof.

In one embodiment, the classification module 303 may classify one or more trajectories based, at least in part, on user movement, vehicle movement, user activity, or a combination thereof. In another embodiment, the classification module 303 may categorize the speed information into acceleration mode, deceleration mode, constant mode, stop mode, or a combination thereof. In a further embodiment, the classification module 303 may divide the heading information into one or more regions for allocation of at least one maneuvering to the at least one region. The identification platform 109 may process vehicular movements, user movements, or a combination thereof within the one or more regions to determine the maneuvering information. In one scenario, heading information from a device in low speed conditions can be noisy. Further, probe data that are not sampled at high speed can be noisy. In such scenario, bearing from one point to another point may be used.

In one embodiment, the extraction module 305 may extract the speed information, the heading information, or a combination thereof from the probe data within the one or more trajectories. In one scenario, the identification platform 109 may process the speed information to determine acceleration information. In another scenario, the identification platform 109 may process the heading information to determine maneuvering information. Further, the identification platform 109 may re-calculate the heading information based, at least in part, on the latitude data, the longitude data, or a combination thereof.

In one embodiment, the transformation module 307 may transform the one or more location points into qualitative categories of the user movement, the user activity, or a combination thereof. In one scenario, the qualitative categories may represent existence of at least one point of interest, temporal information for at least one point of interest, or a combination thereof. In another embodiment, the transformation module 307 may transform the speed information into the qualitative categories based, at least in part, on the categorization of the speed information by the classification module 303. In a further embodiment, the transformation module 307 may transform the heading information into the qualitative categories based, at least in part, on the allocation of maneuvering by the classification module 303. In one scenario, the qualitative categories include an indication of the number of maneuvering associated with the one or more regions, one or more trajectories, or a combination thereof. In one example embodiment, the maneuvering is high if at least one vehicle moves through multiple regions, and the maneuvering is low if at least one vehicle moves within the at least one region.

In one embodiment, the communication module 309 enables formation of a session over a communication network 107 by implementing various protocols and data sharing techniques for enabling collaborative execution between the identification platform 109 and the one or more UE 101s (e.g., autonomous vehicles, devices associated with users, etc.).

In one embodiment, the presentation module 311 obtains a set of summary statistics from the other modules. Then, the presentation module 311 continues with generating a presentation of at least one identified point of interest. In one scenario, the presentation module 311 may cause a presentation wherein at least one point of interest is highlighted. The presentation may also incorporate temporal information (e.g., information on the time of operation, peak hours), density information (e.g., the crowdedness), popularity information, or a combination thereof.

The above presented modules and components of the identification platform 109 can be implemented in hardware, firmware, software, or a combination thereof. Though depicted as a separate entity in FIG. 1, it is contemplated that the identification platform 109 may be implemented for direct operation by respective UE 101. As such, the identification platform 109 may generate direct signal inputs by way of the operating system of the UE 101 for interacting with the applications 103. In another embodiment, one or more of the modules 301-309 may be implemented for operation by respective UEs, as an identification platform 109, or combination thereof. Still further, the identification platform 109 may be integrated for direct operation with the services 115, such as in the form of a widget or applet, in accordance with an information and/or subscriber sharing arrangement. The various executions presented herein contemplate any and all arrangements and models.

Figure 4:
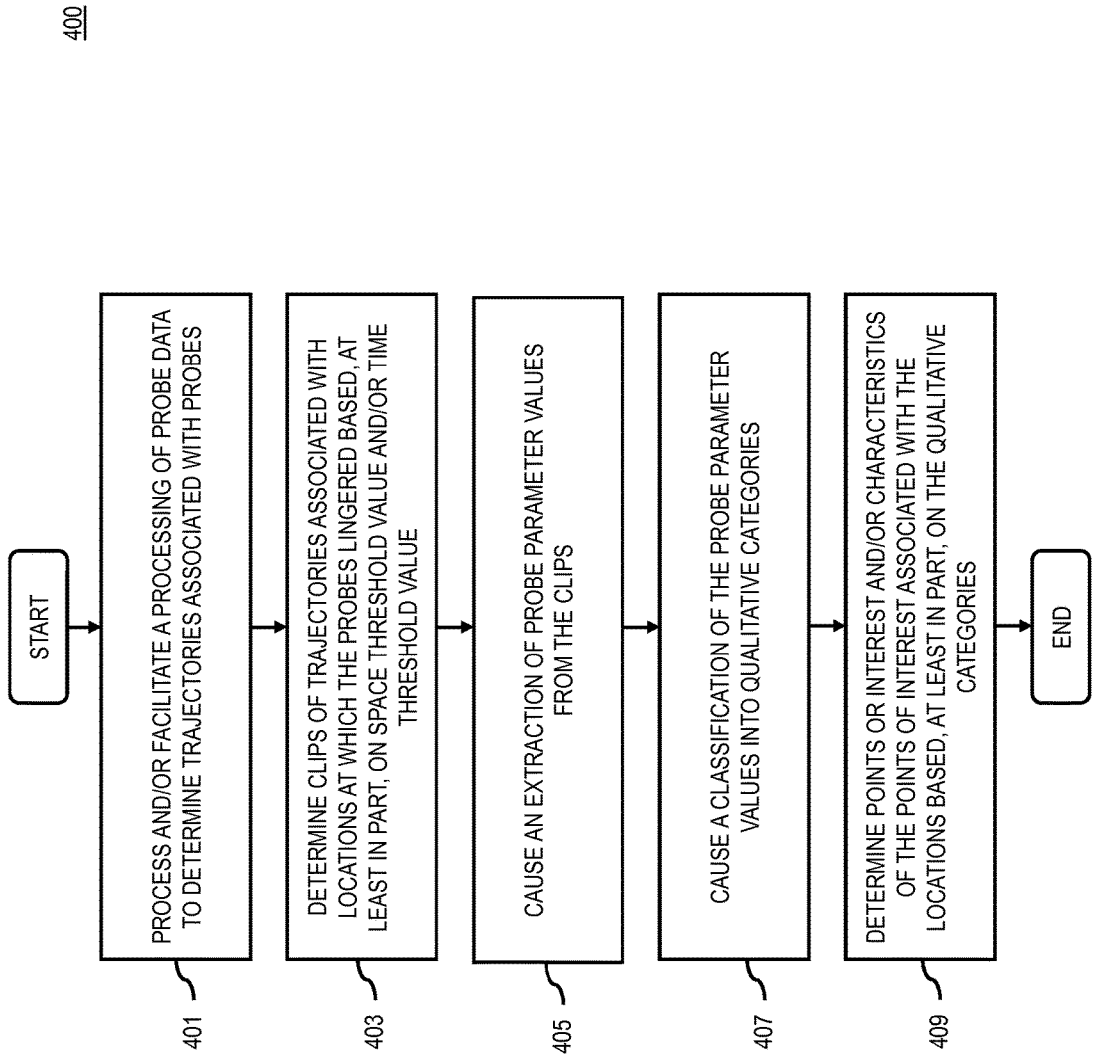
FIG. 4 is a flowchart of a process for extraction and classification of probe parameter values from one or more clips of trajectories for determining a point of interest, according to one embodiment.
Figure 11:
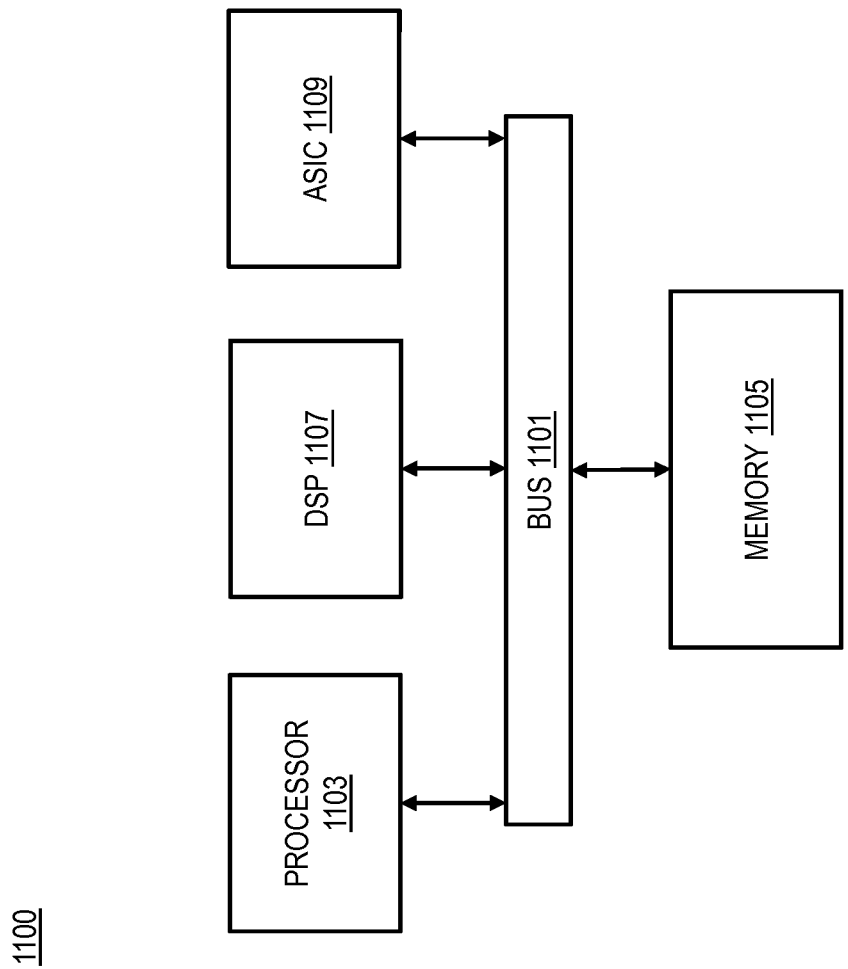
FIG. 11 is a diagram of a chip set that can be used to implement an embodiment of the invention.

FIG. 4 is a flowchart of a process for extraction and classification of probe parameter values from one or more clips of trajectories for determining a point of interest, according to one embodiment. In one embodiment, the identification platform 109 performs the process 400 and is implemented in, for instance, a chip set including a processor and a memory as shown in FIG. 11.

In step 401, the identification platform 109 may process and/or facilitate a processing of probe data to determine one or more trajectories associated with one or more probes. In one scenario, the identification platform 109 may collect probe data from one or more devices associated with at least one user, at least one vehicle, or a combination thereof. Then, the identification platform 109 may analyze the probe data to assemble them into trajectories.

In step 403, the identification platform 109 may determine one or more clips of the one or more trajectories associated with one or more locations at which the one or more probes lingered based, at least in part, on at least one space threshold value, at least one time threshold value, or a combination thereof. In one scenario, the clips of trajectories are specific fractions of the trajectories that correspond to the movement of probe data. The clips of trajectories may be extracted and evaluated to determine speed information (e.g., acceleration, deceleration, stop, etc.), latitude, and longitude. In another scenario, the identification platform 109 may determine the locations where the probes linger in space and time from the trajectory data. These locations are transformed into qualitative representations of user behavior. Such qualitative representations are used to make inferences about at least one point of interest.

In step 405, the identification platform 109 may cause, at least in part, an extraction of one or more probe parameter values from the one or more clips. In one scenario, the one or more probe parameter values include speed information, heading information, activity information, or a combination thereof. The identification platform 109 may extract speed information, heading information, activity information, or a combination thereof from one or more trajectories to classify spatial aspect of user activities.

In step 407, the identification platform 109 may cause, at least in part, a classification of the one or more probe parameter values into one or more qualitative categories. In one scenario, the identification platform 109 may classify the one or more probe parameter values based, at least in part, on the user movement, the user activity, or a combination thereof. In another scenario, the identification platform 109 may classify the one or more probe parameter values based, at least in part, on speed information, heading information, or a combination thereof associated with one or more vehicles. In one example embodiment, the identification platform 109 may classify probe parameter values based on varying speed profile, for example, acceleration and deceleration profile of probe data in a limited spatial area may represent congestion behavior, such classification of probe data may be used in location based services. In another example embodiment, the identification platform 109 may classify probe parameter values in terms of inferred user activities, for example, deceleration, a brief stop to perform certain user activity, and then acceleration may represent existence of a point of interest (e.g., a gas station, a restaurant with drive through lanes etc.). In a further example embodiment, the identification platform 109 may classify probe parameter values in terms of maneuvering, for example, deceleration followed by a high maneuvering may represent a particular point of interest.

In step 409, the identification platform 109 may determine one or more points of interest, one or more characteristics of the one or more points of interest, or a combination thereof associated with the one or more locations based, at least in part, on the one or more qualitative categories. In one embodiment, the one or more characteristics of the one or more points of interest include, at least in part, one or more hours of operation, popularity information, congestion information, or a combination thereof. In one scenario, qualitative categories of trajectories are derived from the probe data. These qualitative categories are used by the identification platform 109 to make inferences about the state of a point of interest, for example, the existence of the point of interest, the business hours of the point of interest, the traffic information around the point of interest (e.g., congestion information), etc.

Figure 5:
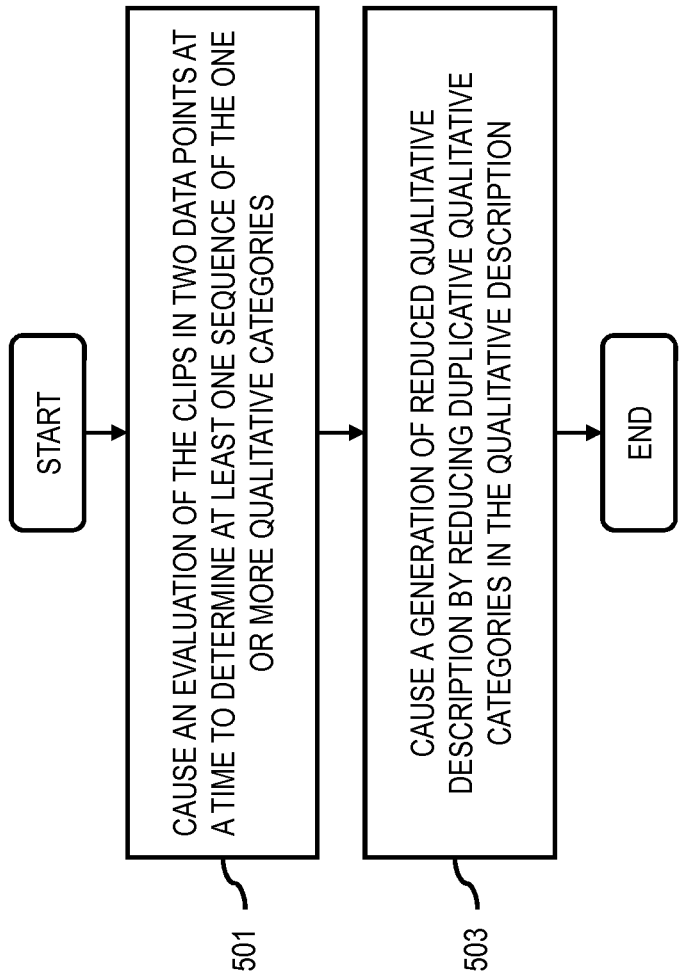
FIG. 5 is a flowchart of a process for evaluating data points associated with one or more clips, and reducing duplicative qualitative categories in the qualitative description, according to one embodiment.

FIG. 5 is a flowchart of a process for evaluating data points associated with one or more clips, and reducing duplicative qualitative categories in the qualitative description, according to one embodiment. In one embodiment, the identification platform 109 performs the process 500 and is implemented in, for instance, a chip set including a processor and a memory as shown in FIG. 11.

In step 501, the identification platform 109 may cause, at least in part, an evaluation of the one or more clips two data points at a time to determine at least one sequence of the one or more qualitative categories. In one scenario, the probe parameter values that are extracted are evaluated in terms of acceleration. The identification platform 109 may evaluate two probe locations in a trajectory at a time to determine acceleration. In one example embodiment, the identification platform 109 may select two adjacent probe points in a trajectory. The identification platform 109 may determine acceleration when the at least one probe point has higher speed that the other adjacent probe point. In one embodiment, the at least one sequence of the one or more qualitative categories represents at least one qualitative description of the one or more clips. In another embodiment, the one or more points of interest, the one or more characteristics of the one or more points of interest, or a combination thereof is determined based, at least in part, on the at least one qualitative description.

In step 503, the identification platform 109 may cause, at least in part, a generation of at least one reduced qualitative description by reducing one or more duplicative qualitative categories in the at least one qualitative description. In one scenario, the identification platform 109 may classify acceleration information into qualitative categories to capture a basic behavior. For example, the activity of at least one vehicle decelerating, decelerating, decelerating, and stopping may be reduced to just decelerating and stopping. In such manner, the identification platform 109 may reduce duplicate qualitative categories in the qualitative description. In one embodiment, the one or more points of interest, the one or more characteristics of the one or more points of interest, or a combination thereof is determined based, at least in part, on the at least one reduced qualitative description. In another embodiment, the one or more probe parameter values include, at least in part, one or more speed values, one or more heading values, or a combination thereof.

Figure 6:
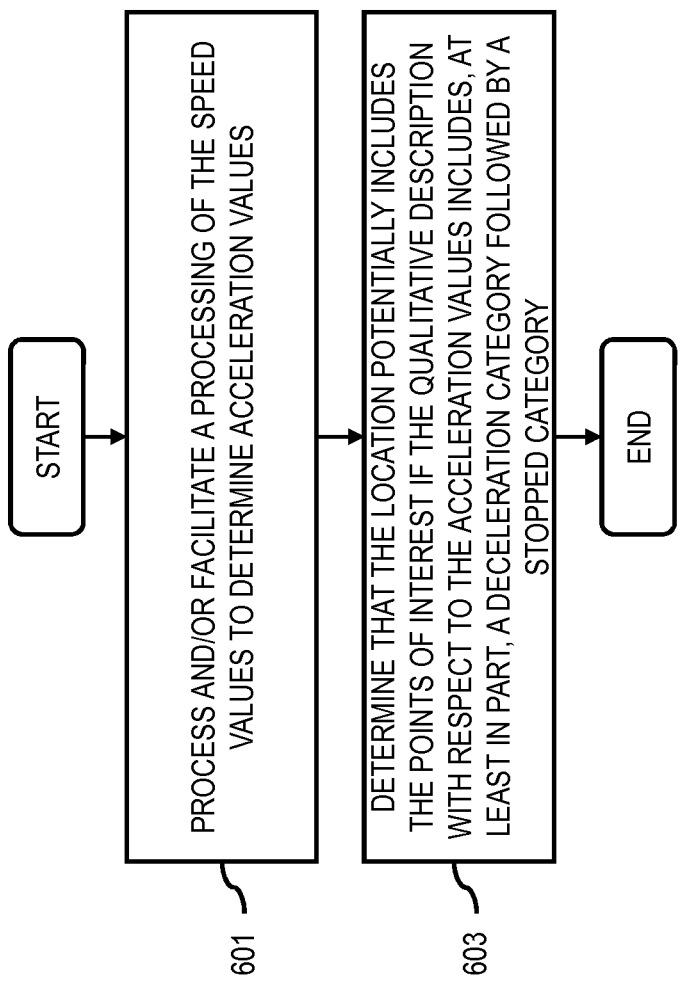
FIG. 6 is a flowchart of a process for processing speed values to determine acceleration values, and determine at least one location based on acceleration values, according to one embodiment.

FIG. 6 is a flowchart of a process for processing speed values to determine acceleration values, and determine at least one location based on acceleration values, according to one embodiment. In one embodiment, the identification platform 109 performs the process 600 and is implemented in, for instance, a chip set including a processor and a memory as shown in FIG. 11.

In step 601, the identification platform 109 may process and/or facilitate a processing of the one or more speed values to determine one or more acceleration values. In one embodiment, the one or more qualitative categories for the one or more acceleration values include, at least in part, an acceleration category, a deceleration category, a constant speed category, a stopped category, or a combination thereof. In one scenario, the identification platform 109 may characterize specific point of interest by the means of specific behaviors. In one example embodiment, specific behavior of a vehicle (e.g., acceleration, deceleration, headings) may be a specific signature for a specific point of interest.

In step 603, the identification platform 109 may determine that the one or more location potentially includes the one or more points of interest if the at least one qualitative description with respect to the one or more acceleration values includes, at least in part, a deceleration category followed by a stopped category. In one scenario, the identification platform 109 may reduce acceleration data into qualitative descriptions using acceleration, deceleration, constant, and stopped as the qualitative categories. The descriptions may capture the basic behaviors that indicate a potential stop at a destination. This can be further used to infer that the location is a point of interest. In one example embodiment, the pattern of starting and stopping at least one vehicle in a certain profile may be processed to characterize whether a fast food restaurant has a drive through lane. The drive through lanes may have distinct qualitative behavior that builds-up over time around the at least one point of interest.

Figure 7:
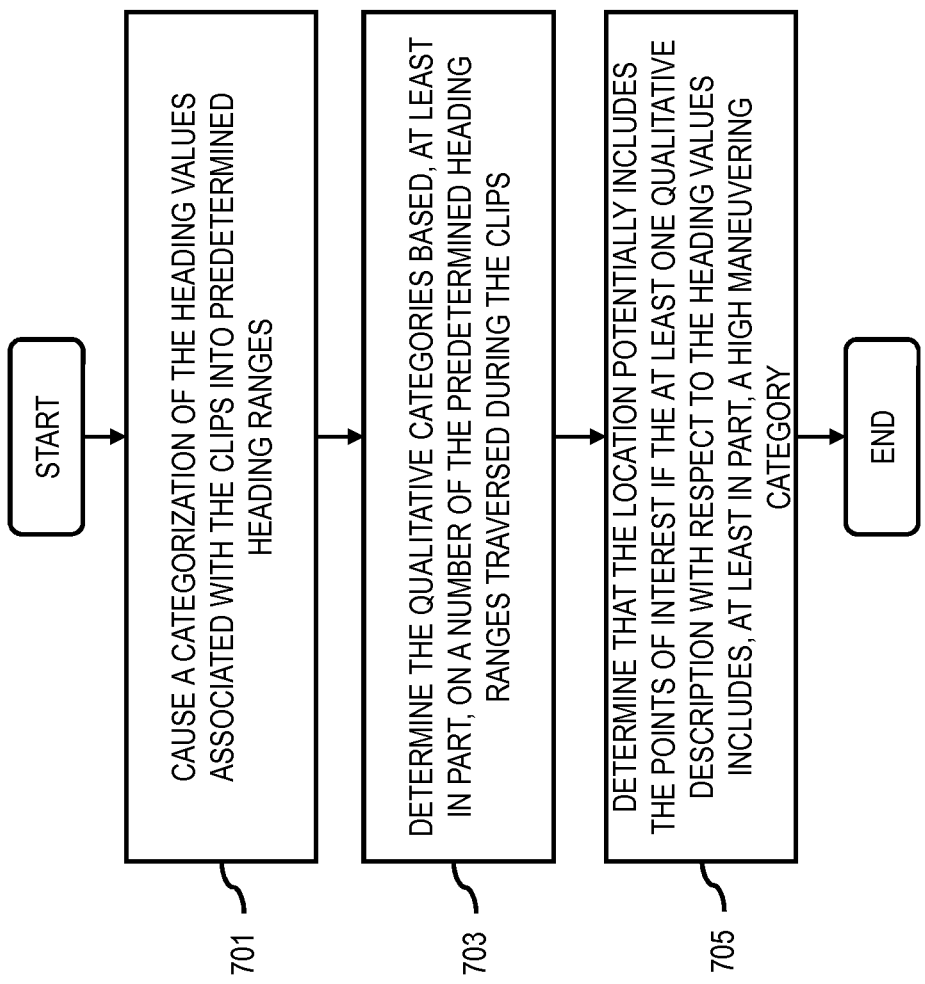
FIG. 7 is a flowchart of a process for determining qualitative categories for at least one point of interest based on heading ranges, according to one embodiment.

FIG. 7 is a flowchart of a process for determining qualitative categories for at least one point of interest based on heading ranges, according to one embodiment. In one embodiment, the identification platform 109 performs the process 700 and is implemented in, for instance, a chip set including a processor and a memory as shown in FIG. 11.

In step 701, the identification platform 109 may cause, at least in part, a categorization of the one or more heading values associated with the one or more clips into one or more predetermined heading ranges. In one example embodiment, the identification platform 109 may reduce the heading information to 8 regions in the heading range (e.g., 8 sections of a 360 degree circle). In one scenario, the heading information may be reduced to 8 equal sections (each 45 degrees) of the 360 degree circle. Then, the identification platform 109 may assign at least one heading to at least one region. Subsequently, the identification platform 109 may reduce the heading information to a qualitative description with the goal of indicating the amount of maneuvering associated with the trajectory.

In step 703, the identification platform 109 may determine the one or more qualitative categories based, at least in part, on a number of the one or more predetermined heading ranges traversed during the one or more clips. In one embodiment, the one or more qualitative categories includes at least one high maneuvering category if the number of the one or more predetermined heading ranges traversed during the one or more clips is high. In another embodiment, the one or more qualitative categories includes at least one low maneuvering category if the number of the one or more predetermined heading ranges traversed during the one or more clips is low. In one example embodiment, if at least one vehicle moves through a variety of the regions then the maneuvering is high, while if the vehicle stays in one or two regions then the maneuvering is low. The identification platform 109 may implement this measure to differentiate a destination versus a simple congestion on a straight road.

In step 705, the identification platform 109 may determine that the one or more location potentially includes the one or more points of interest if the at least one qualitative description with respect to the one or more heading values includes, at least in part, a high maneuvering category. In one scenario, the identification platform 109 may perform heading mathematics in the heading map (i.e., 360 bounded values divided into 8 regions) to determine one or more changes going in the trajectories. Then, the identification platform 109 may determine that a user has crossed 3 regions and has undergone a significant maneuvering. This activity gives a qualitative representation of at least one point of interest (e.g., a drive-through restaurant).

Figure 8:
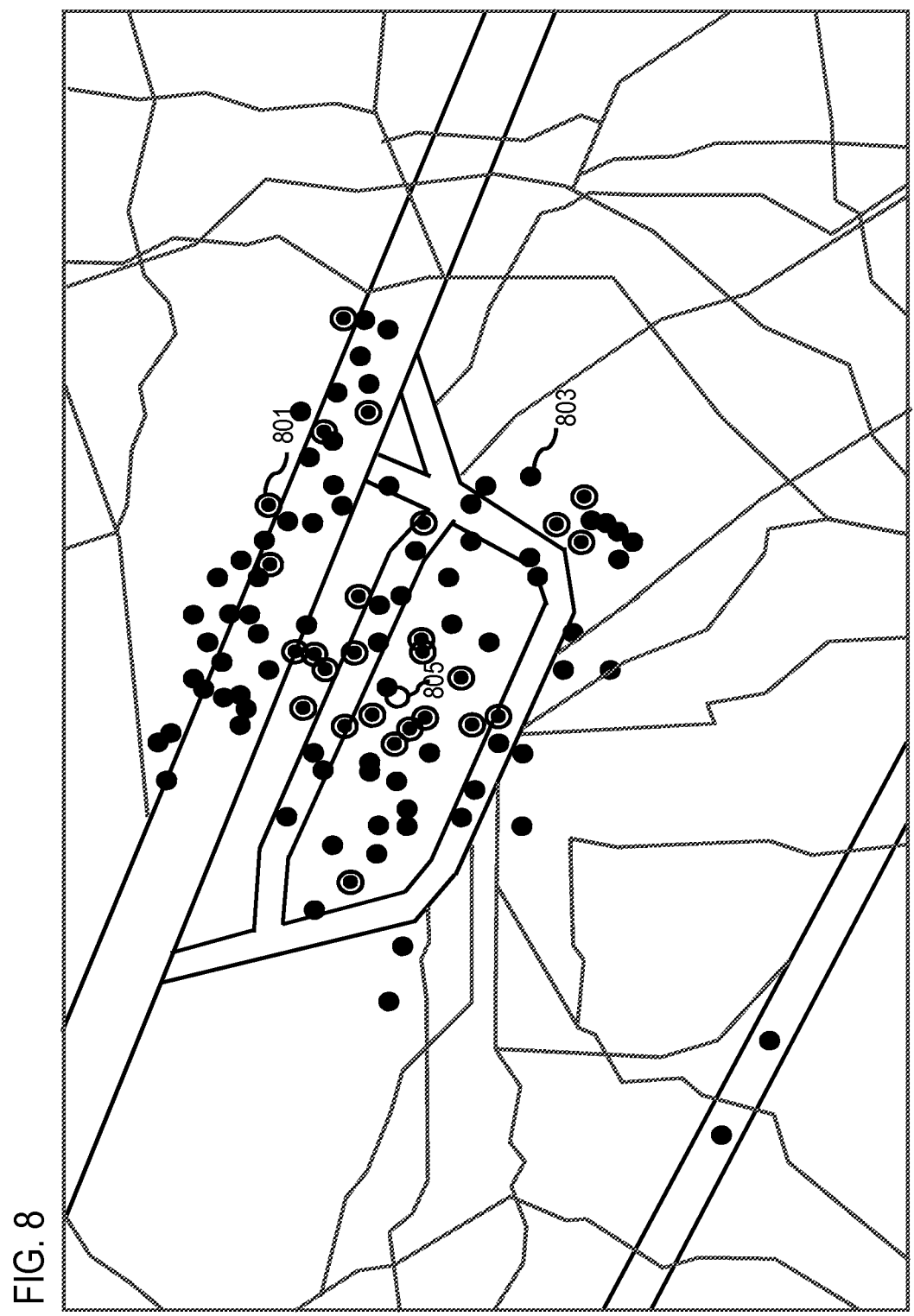
FIG. 8 is a diagram for classifying user behaviors using qualitative trajectory analytics for identifying at least one point of interest, according to one example embodiment.

FIG. 8 is a diagram for classifying user behaviors using qualitative trajectory analytics for identifying at least one point of interest, according to one example embodiment. FIG. 8 may represent location points where probes have lingered for certain duration (e.g., 6-10 minutes). In one scenario, the dark points with ring 801 may represent probes that exhibit destination behavior as well as a high maneuvering behavior. The dark points with ring 801 have specific signature that might represent a particular point of interest. For example, a driver may stop his vehicle in a particular location and performs high maneuvering. Then, the driver may slow down and stop for a certain duration (e.g., 4 minutes). Subsequently, the driver leaves the location. This action may represent user filling their vehicles with gas at a petrol station. In another scenario, the dark points 803 may show the recorded location of a petrol station. Since, qualitative signatures exhibit destination behaviors, the dark points 803 for a variety of reasons may not have enough probe data. The dark points 803 may represent state points that determine position of one or more users in geographical space and time. In a further scenario, the unfilled point 805 may be the centroid of the probes that also exhibits destination behavior and high maneuvering behavior. This density of points that represents the behavior can be used to infer the presence of the petrol station. In another example embodiment, at least one point of interest may comprise of a petrol station with a restaurant. This point of interest may cater to users who may stop for gas and for eating. The identification platform 109 may process the density of points that represents user behaviors to infer the presence of a petrol station alongside a restaurant. The identification platform 109 may separate the characteristics of one or more dark points without rings to determine the existence to two separate units within a point of interest.

Figure 9:
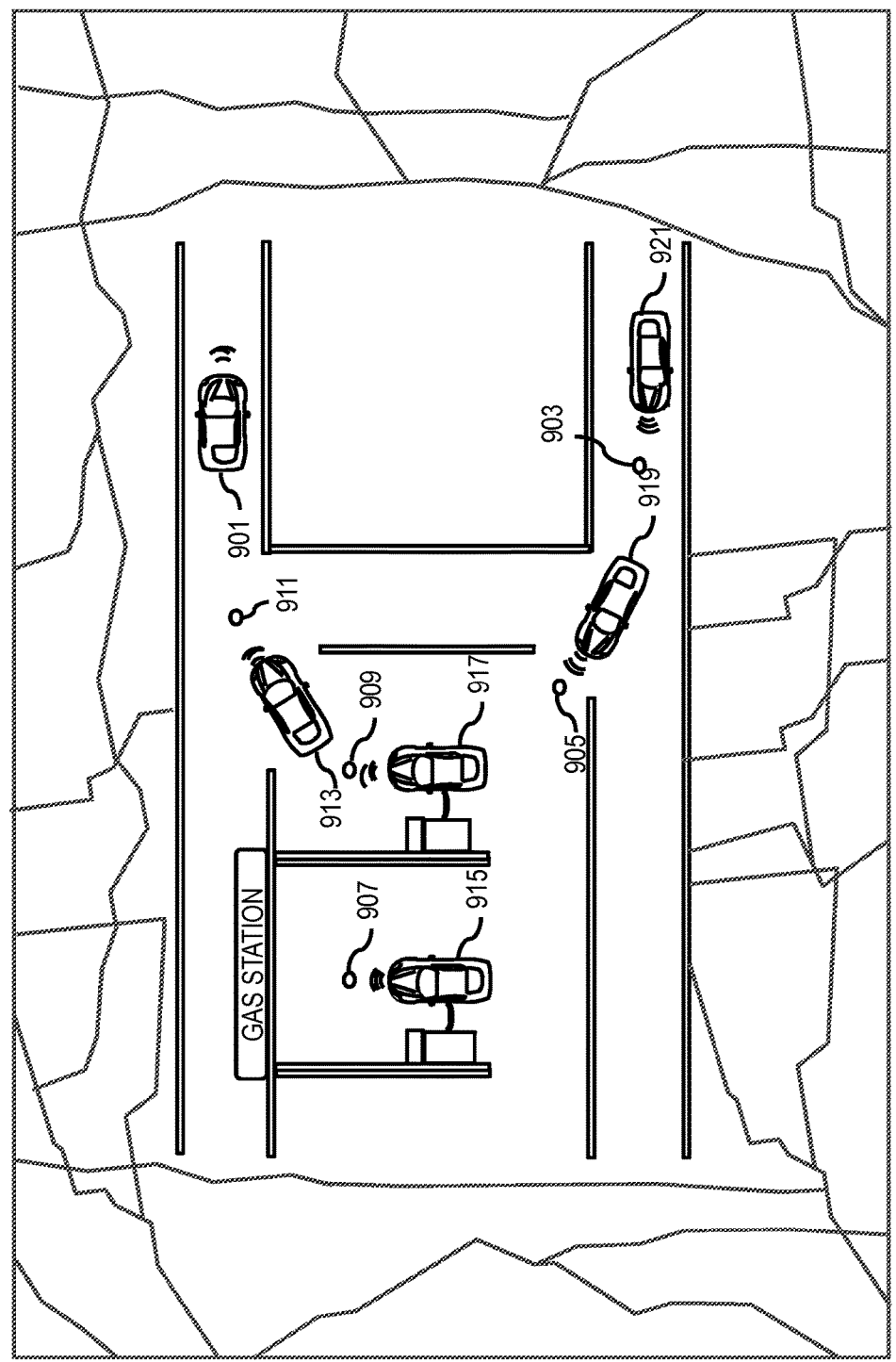
FIG. 9 is a diagram that represents a scenario wherein user behaviors are processed using qualitative trajectory analytics for identifying the existence of a petrol station, according to one example embodiment.

FIG. 9 is a diagram that represents a scenario wherein user behaviors are processed using qualitative trajectory analytics for identifying the existence of a petrol station, according to one example embodiment. In one scenario, a driver of vehicle 901 may slow-down his vehicle at location point 903. Then, the driver of vehicle 901 may perform high maneuvering at location point 905 and stop at location points 907 or 909. The vehicle 901 may remain stationary for certain duration (e.g., 3-5 minutes) at location point 909. Subsequently, the driver may perform high maneuvering at location point 911 and leaves the location. Correspondingly, several other vehicles 913, 915, 917, 919 and 921 visiting the particular point of interest may exercise similar behavior. The identification platform 109 may process the behavioral patterns of the one or more vehicles 901, 913, 915, 917, 919 and 921 to identify specific behaviors. The identification platform 109 may characterize a particular point of interest based, at least in part, on a specific behavioral patterns exhibited by one or more users, one or more vehicles, or a combination thereof. For example, one or more vehicles slowing-down, turning, stopping, and accelerating might be a signature for a specific point of interest. The identification platform 109 may apply the determined signature (e.g., a certain type of acceleration, a certain type of deceleration, a certain type of maneuvering, etc.) to identify the point of interest to be a petrol station.

The processes described herein for classifying probe data into qualitative categories to determine a point of interest may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
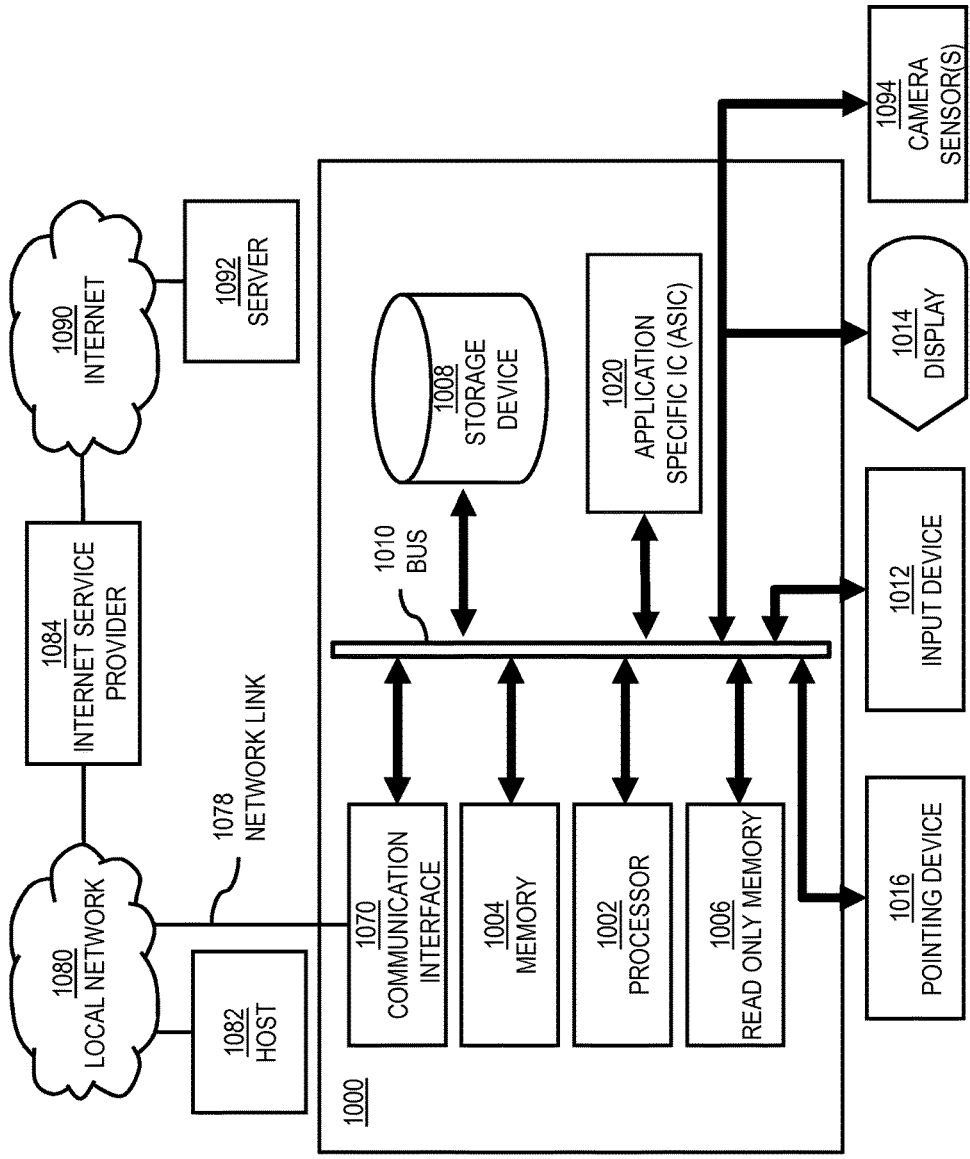
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to classify probe data into qualitative categories to determine a point of interest as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of classifying probe data into qualitative categories to determine a point of interest.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to classify probe data into qualitative categories to determine a point of interest. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1000 also includes a memory 1004 coupled to bus 1010. The memory 1004, such as a random access memory (RAM) or any other dynamic storage device, stores information including processor instructions for classifying probe data into qualitative categories to determine a point of interest. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for classifying probe data into qualitative categories to determine a point of interest, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014, and one or more camera sensors 1094 for capturing, recording and causing to store one or more still and/or moving images (e.g., videos, movies, etc.) which also may comprise audio recordings. In some embodiments, for example, in embodiments in which the computer system 1000 performs all functions automatically without human input, one or more of external input device 1012, display device 1014 and pointing device 1016 may be omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 107 for classifying probe data into qualitative categories to determine a point of interest to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to classifying probe data into qualitative categories to determine a point of interest as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of classifying probe data into qualitative categories to determine a point of interest.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to classify probe data into qualitative categories to determine a point of interest. The memory 1105 also stores the data associated with or generated by the execution of the inventive steps.

Figure 12:
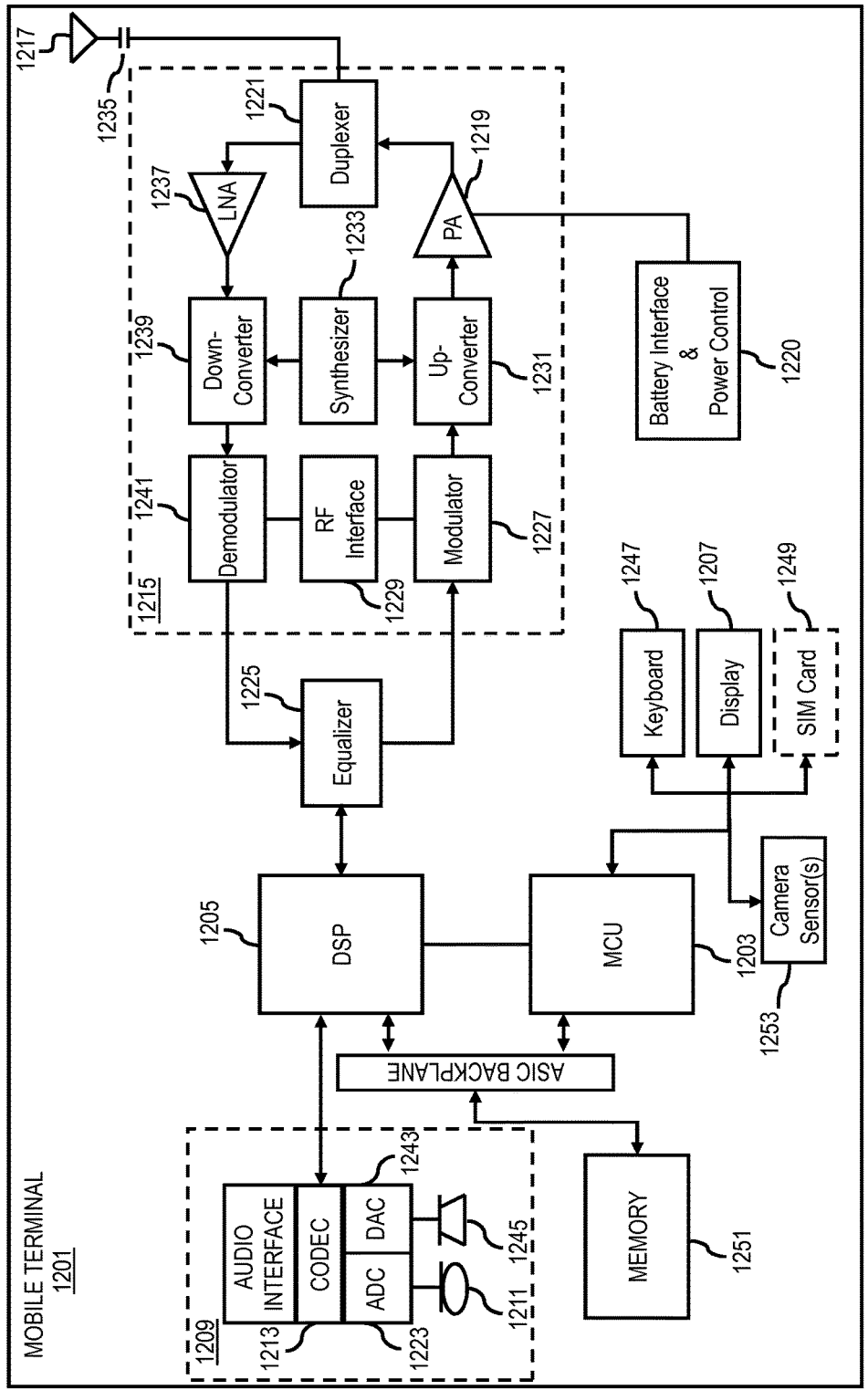
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of classifying probe data into qualitative categories to determine a point of interest. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of classifying probe data into qualitative categories to determine a point of interest. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to classify probe data into qualitative categories to determine a point of interest. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Further, one or more camera sensors 1253 may be incorporated onto the mobile station 1201 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order. The methods and systems (including steps and components thereof) can be mixed, matched, and/or rearranged. Additionally more, fewer, or different method steps or device/system components may be provided with less, more or different steps.

What is claimed is:

1. A method for automated detection of a point of interest from probe data, comprising:
    processing the probe data to determine one or more trajectories associated with one or more probes, wherein the one or more probes are vehicles with corresponding location sensors, and wherein the location sensors receive location signals represented by the probe data;
    determining one or more clips of the one or more trajectories associated with a location at which the one or more probes lingered based on a comparison of the location signals collected by the location sensors in the one or more clips to at least one space threshold value or at least one time threshold value;
    extracting one or more probe parameter values from the one or more clips, wherein the one or more probe parameter values include one or more heading values determined from the location signals collected by the location sensors;
    classifying the one or more probe parameter values into one or more qualitative categories by categorizing the one or more heading values associated with the one or more clips into one or more predetermined heading ranges, wherein the one or more qualitative categories include a plurality of driving maneuver categories;
    determining, by an apparatus without user inputs and without knowledge of an existence of the point of interest, the location as a point of interest and a type of the point of interest based on the one or more qualitative categories; and
    updating, by the apparatus, the location as the point of interest associated with the type of point of interest in a geographic database,
    wherein a map application presentation of the point of interest marked with the type of point of interest is provided on a user interface based on the geographic database for navigation or one or more navigation-related services.

2. A method of claim 1, further comprising:
    causing an evaluation of the one or more clips two data points at a time to determine at least one sequence of the one or more qualitative categories,
    wherein the qualitative categories represent at least one qualitative description of the one or more clips;
    wherein the qualitative categories include an indication of a number of driving maneuvers associated with the location; and
    wherein the point of interest is determined based on the at least one qualitative description.

3. A method of claim 2, further comprising:
causing a generation of the at least one reduced qualitative description by reducing one or more duplicative qualitative categories in the at least one qualitative description,
wherein the point of interest is determined based on the at least one reduced qualitative description.

4. A method of claim 1, wherein the one or more probe parameter values further include one or more speed values.

5. A method of claim 4, further comprising:
processing the one or more speed values to determine one or more acceleration values,
wherein the driving maneuver categories include an acceleration category, a deceleration category, a constant speed category, and a stopped category.

6. A method of claim 5, further comprising:
determining that the location as the point of interest when the at least one qualitative description with respect to the one or more acceleration values includes a deceleration category followed by a stopped category.

7. A method of claim 1, further comprising:
determining the one or more qualitative categories further based, at least in part, on a number of the one or more predetermined heading ranges traversed during the one or more clips.

8. A method of claim 7, wherein the one or more qualitative categories include a high amount of driving maneuvering when the number of the one or more predetermined heading ranges traversed during the one or more clips is high; and wherein the one or more qualitative categories include a low amount of driving maneuvering when the number of the one or more predetermined heading ranges traversed during the one or more clips is low.

9. A method of claim 8, further comprising:
determining that the location as the point of interest when the at least one qualitative description with respect to the one or more heading values includes a high amount of driving maneuvering.

10. A method of claim 1, further comprising:
determining one or more hours of operation, popularity information, or a combination thereof of the point of interest based on the probe data.

11. An apparatus for automated detection of a point of interest from probe data, comprising:
at least one processor; and
at least one memory including computer program code for one or more programs,
the at least one memory and the computer program code configured to, with the at least one processor, cause the apparatus to perform at least the following,
process the probe data to determine one or more trajectories associated with one or more probes, wherein the one or more probes are vehicles with corresponding location sensors, and wherein the location sensors receive location signals represented by the probe data;
determine one or more clips of the one or more trajectories associated with a location at which the one or more probes lingered based on a comparison of the location signals collected by the location sensors in the one or more clips to at least one space threshold value or at least one time threshold value;
extract one or more probe parameter values from the one or more clips, wherein the one or more probe parameter values include one or more heading values determined from the location signals collected by the location sensors;
classify the one or more probe parameter values into one or more qualitative categories by categorizing the one or more heading values associated with the one or more clips into one or more predetermined heading ranges, wherein the one or more qualitative categories include a plurality of driving maneuver categories;
determine, without user inputs and without knowledge of an existence of the point of interest, the location as a point of interest and a type of the point of interest based on the one or more qualitative categories; and
update the location as the point of interest associated with the type of point of interest in a geographic database,
wherein a map application presentation of the point of interest marked with the type of point of interest is provided on a user interface based on the geographic database for navigation or one or more navigation-related services.

12. An apparatus of claim 11, wherein the apparatus is further caused to:
cause an evaluation of the one or more clips two data points at a time to determine at least one sequence of the one or more qualitative categories,
wherein the qualitative categories represent at least one qualitative description of the one or more clips;
wherein the qualitative categories include an indication of a number of driving maneuvers associated with the location; and
wherein the point of interest is determined based on the at least one qualitative description.

13. An apparatus of claim 12, wherein the apparatus is further caused to:
cause a generation of the at least one reduced qualitative description by reducing one or more duplicative qualitative categories in the at least one qualitative description,
wherein the point of interest is determined based on the at least one reduced qualitative description.

14. An apparatus of claim 11, wherein the one or more probe parameter values further include one or more speed values.

15. An apparatus of claim 14, wherein the apparatus is further caused to:
process the one or more speed values to determine one or more acceleration values,
wherein the driving maneuver categories include an acceleration category, a deceleration category, a constant speed category, and a stopped category.

16. An apparatus of claim 15, wherein the apparatus is further caused to:
determine that the location as the point of interest when the at least one qualitative description with respect to the one or more acceleration values includes a deceleration category followed by a stopped category.

17. An apparatus of claim 14, wherein the apparatus is further caused to:
determine the one or more qualitative categories further based, at least in part, on a number of the one or more predetermined heading ranges traversed during the one or more clips.

18. A non-transitory computer-readable storage medium for automated detection of a point of interest from probe data carrying one or more sequences of one or more instructions which, when executed by one or more processors, cause an apparatus to at least perform the following steps:

processing the probe data to determine one or more trajectories associated with one or more probes, wherein the one or more probes are vehicles with corresponding location sensors, and wherein the location sensors receive location signals represented by the probe data;

determining one or more clips of the one or more trajectories associated with a location at which the one or more probes lingered based on a comparison of the location signals collected by the location sensors in the one or more clips to at least one space threshold value or at least one time threshold value;

extracting one or more probe parameter values from the one or more clips, wherein the one or more probe parameter values include one or more heading values determined from the location signals collected by the location sensors;

classifying the one or more probe parameter values into one or more qualitative categories by categorizing the one or more heading values associated with the one or more clips into one or more predetermined heading ranges, wherein the one or more qualitative categories include a plurality of driving maneuver categories;

determining, without user inputs and without knowledge of an existence of the point of interest, the location as a point of interest and a type of the point of interest based on the one or more qualitative categories; and updating the location as the point of interest associated with the type of point of interest in a geographic database, wherein a map application presentation of the point of interest marked with the type of point of interest is provided on a user interface based on the geographic database for navigation or one or more navigation-related services.

19. A non-transitory computer-readable storage medium of claim 18, wherein the apparatus is further caused to:

cause an evaluation of the one or more clips two data points at a time to determine at least one sequence of the one or more qualitative categories, wherein the qualitative categories represent at least one qualitative description of the one or more clips;

wherein the qualitative categories include an indication of a number of driving maneuvers associated with the location; and wherein the point of interest is determined based on the at least one qualitative description.

20. A non-transitory computer-readable storage medium of claim 19, wherein the apparatus is further caused to:

cause a generation of the at least one reduced qualitative description by reducing one or more duplicative qualitative categories in the at least one qualitative description, wherein the point of interest is determined based on the at least one reduced qualitative description.

* * * * *